United States Patent

Gottschald et al.

[11] Patent Number: 5,989,102
[45] Date of Patent: Nov. 23, 1999

[54] APPARATUS FOR FACETTING OPHTHALMIC LENSES

[75] Inventors: Lutz Gottschald, Meerbusch; Klaus Eickmeyer, Haan, both of Germany

[73] Assignee: Wernicke & Co., GmbH, Dusseldorf, Germany

[21] Appl. No.: 08/585,744

[22] Filed: Jan. 16, 1996

Related U.S. Application Data

[63] Continuation of application No. 08/256,410, filed as application No. PCT/DE93/00028, Jan. 13, 1993, abandoned.

[30]     Foreign Application Priority Data

Jan. 13, 1992  [DE]  Germany .................... 42 00 637

[51] Int. Cl.⁶ ................. B24B 49/00; B24B 51/00
[52] U.S. Cl. .................... 451/5; 451/41; 451/42
[58] Field of Search .................. 451/42, 43, 44, 451/5, 9, 240, 41, 28, 390, 384, 921; 156/636.1

[56]            References Cited

U.S. PATENT DOCUMENTS

| | | | |
|---|---|---|---|
| 4,179,851 | 12/1979 | Neisler et al. | 451/43 |
| 4,286,415 | 9/1981 | Loreto | 451/44 |
| 4,434,581 | 3/1984 | Spriggs | 451/42 |
| 5,149,337 | 9/1992 | Watanabe | 451/43 |
| 5,320,006 | 6/1994 | Blocha et al. | 451/42 |

FOREIGN PATENT DOCUMENTS 9103794  3/1991  WIPO.

*Primary Examiner*—David A. Scherbel
*Assistant Examiner*—Derris H. Banks
*Attorney, Agent, or Firm*—Antonelli, Terry, Stout, & Kraus, LLP

[57]              ABSTRACT

The description relates to a device for facetting ophthalmic lenses with at least one facetting tool which can be engaged with a ophthalmic lens held in a clamp and with a control unit in which the reference data for the facetting tool for the radius r of the lens to be machined in relation to the angle of rotation ($\phi$) are stored and which controls the operation in accordance with these reference data. The invention is especially characterized in that the control unit controls the relative movement of the tool along the z axis in such a way that the facet has a predeterminable position on the peripheral edge of the lens.

19 Claims, 1 Drawing Sheet

APPARATUS FOR FACETTING OPHTHALMIC LENSES

This application is a continuation application of Ser. No. 08/256,410, filed Jul. 11, 1994, now abandoned which is a 371 of PCT/DE93/00028 filed Jan. 13, 1993.

TECHNICAL FIELD

The present invention relates to an apparatus for facetting opthalmic lenses, having at least one facetting tool which can be brought into contact with an opthalmic lens, which is held in a grip, and having for the facetting tool a control unit, in which the scheduled data for the radius r of the opthalmic lens to be processed in relation to the angle φ are stored, and which controls the processing according to these scheduled data.

STATE OF THE ART

Apparatuses of this type are common knowledge and are manufactured, by way of illustration, by Wernicke & Co. GmbH, 400 Düsseldorf, Germany both as numerically controlled apparatuses as well as so-called copy automats, which are controlled by a form disks or the like. The state-of-the-art apparatuses for facetting opthalmic lenses produce a facet whose position on the peripheral edge of the opthalmic lens is more or less coincidence.

In a number of instances, by way of illustration, in the case of minus lenses having a relatively large edge thickness, such "an uncontrolled" facet results in an unattractive appearance of the finished lens, because the edge of the opthalmic lens runs unevenly in relation to the lens ring of the frame.

DESCRIPTION OF THE INVENTION

The object of the present invention is to improve an apparatus for facetting opthalmic lenses, having at least one facetting tool which can be brought into contact with an opthalmic lens, which is held in a grip, and having for the facetting tool a control unit, in which the scheduled data for the radius r of the opthalmic lenses to be processed in relation to the angle φ are stored, and which controls the processing according to these scheduled data in such a manner that the facetted opthalmic lens runs even in relation to the lens ring of the respective frame following insertion into the frame.

An element of the present invention is that a generic apparatus for facetting ophthalmic lenses, having at least one facetting tool, is improved in such a manner that the control unit regulates the relative movement of the tool in direction of the z axis, i.e. the axis perpendicular to the "plane of the opthalmic lens", in such a way that the facet has a prescribed position on the peripheral edge of the opthalmic lens.

The basis can be a state-of-the-art facetting apparatus, by way of illustration a numerically or a template-controlled apparatus so that a detailed description of this apparatus can be obviated.

In order to control, respectively regulate, the position of the facet, the ophthalmic lens holder or, preferably, the facetting tool shaft is designed in such a manner that it can be moved in the direction of the z axis, i.e. in a direction which is approximately perpendicular to the apex of the lens, respectively running in or parallel to the axis of the shaft of the tool. A drive, which is regulated by the control unit, moves the tool, respectively the opthalmic lens holder, in such a manner relative to the peripheral edge of the lens to be facetted that the facet has a prescribed position on the peripheral edge of the opthalmic lens.

In order to regulate the drive, the control unit is provided with a sensor which determines the z coordinates of the peripheral edge of the opthalmic lens as the function of φ.

This sensor is preferably an optical sensor which determines the z coordinates "on-line" prior to commencement of or during the facetting step. Optical sensors of this type, which by way of illustration can be imaging sensors or edge sensors, which are based on glancing incidence, have the advantage over tactile sensors that the ophthalmic lens is not scratched when coming into contact with the sensor.

Instead of or in addition to utilization of a sensor integrated in the facetting apparatus, sets of data z(φ) giving the course in the z direction of the frame into which the opthalmic lens to be processed is to be inserted as the function of φ can be entered into the control unit.

These sets of data z(φ) can, according to claim 5, be measured by an off-line measuring device, such as a tracer, and entered via an interface. As an alternative, the sets of data z(φ) can be entered into the control unit as "points of measurement" via an entry means, by way of illustration an overlay keyboard.

In any event, it is advantageous if the control unit computes the position of the facet on the peripheral edge of the ophthalmic lens directly from the stored or determined sets of data z(φ).

The control unit can position the facet on the peripheral edge in such a manner that protrusions of the opthalmic lens toward the front over the frame are about the same at all points. Other positions and, in particular, any prescribed position of the facet are, of course, also conceivable.

A preferred design of the facetting apparatus has a linear guide which moves the facetting tool relative to the gripped ophthalmic lens in the z direction and in which, by way of illustration, a slide is guided in a moveable manner. The slide drive, which in particular can bear the tool, can occur by means of a motor the rotation of which can be transferred to the slide via a transmission unit, designed in an, as such, known manner, in such a way that it executes a linear movement.

In any event, it is preferable if an angle of rotation sensor determines the angle of rotation of a rotation drive for the slide, respectively the drive shaft of the motor. This permits very precise regulation of the relative position between the tool and the peripheral edge in such a manner that the position of the facet on the peripheral edge can be controlled precisely.

In principle, any motor can be employed as the drive motor as long as its construction allows precise enough control of their rotation position. Such a motor is, by way of illustration, a step-by-step motor, which has the advantage that this type of motor permits very "sensitive" setting of a specific angle of rotation.

In any case, it is however preferable if two stops limiting the movement of the slide are provided in the drive unit. Not only limiting the relative path of movement in this way, but also making a mode of operation possible which permits especially effective facetting as well even if no controlled facet is required:

If a slipping clutch, which interrupts the flow of power between the motor and the slide when the slide is at one of the stops is provided, the following mode of operation is possible alternatively or whenever no controlled facet is to be produced:

When no facet with a prescribed position on the peripheral edge is to be produced, the control unit regulates the drive unit in such a manner that the slide executes an oscillating, respectively a swinging movement, with the control unit reversing the direction of the slide movement as soon as a slip sensor detects a slipping of the slipping clutch. This permits a quick, precise and gentle edge processing and, in particular, facetting.

Naturally, in addition to the tool essentially suited for facetting, the apparatus designed according to the present invention can also be provided with other tools, disposed in particular on the same axis. These tools cannot only be employed for processing the edge and, in particular, for edging or facetting, but also for deburring. It is preferable if the control unit utilizes the stored, respectively on-line determined sets of data also for carrying out other tasks, by way of illustration, for deburring.

BRIEF DESCRIPTION OF THE DRAWING

The present invention is made more apparent in the following using a preferred embodiment with reference to the accompanying drawings:

the single FIGURE of which shows diagrammatically a side view of the apparatus for facetting.

DESCRIPTION OF A PREFERRED EMBODIMENT

Figure 1:
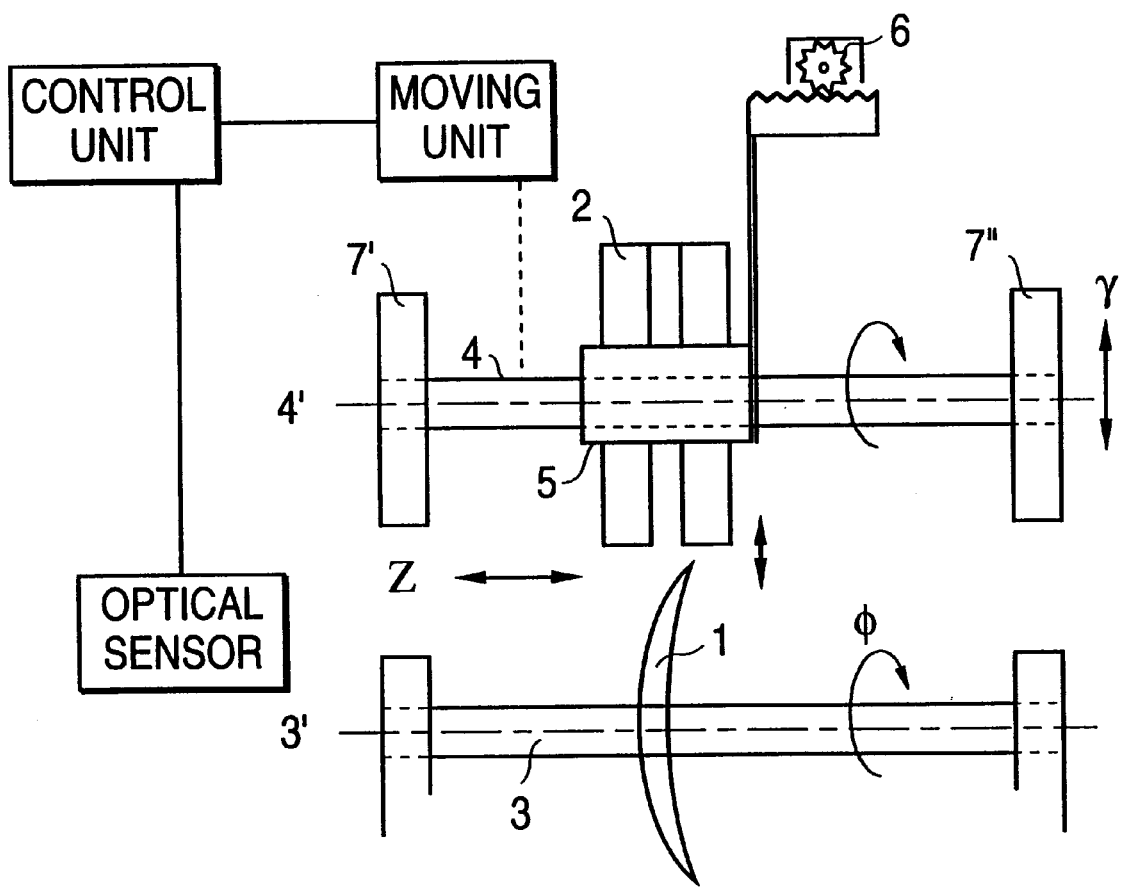

The drawing shows an apparatus for facetting an opthalmic lens 1. The apparatus is provided with a facetting tool 2 composed of a series of single tools, not depicted herein in more detail, which can be brought into contact consecutively with an opthalmic lens 1 held in a grip 3 and perform various processing steps. At least one of the single tools is a rough-grinding disk. The facetting tool is disposed on a spindle 4, which can be rotated about its longitudinal axis 4', and which can be moved by a moving unit, in direction of the radius r of the ophthalmic lens 1 in such a manner that the "feed motion" of the facetting tool 2 in relation to the ophthalmic lens 1 can be adjusted.

Provided in an, as such, known manner is a control unit, which is in particular an electronic control unit and which regulates feeding the facetting tool 2 in the r direction onto the ophthalmic lens 1 in dependence on the angle of rotation $\phi$ of the opthalmic lens about the longitudinal axis 3' of the grip. For this purpose, scheduled data for the radius r of the opthalmic lens to be processed in dependence on the angle of rotation $\phi$ of the opthalmic lens about the grip 3 are stored in the control unit.

According to the present invention, the facetting tool 2 is disposed on a slide 5 which can be moved in the direction of the axis of the spindle 4, i.e. in the direction of the z axis, by a drive. For this purpose a motor 6 is provided by whose rotary movement the slide 5 is moved in the z direction via a transmission unit. The motor 6 is preferably a step-by-step motor. Furthermore, two stops 7' and 7" are provided which limit the movement of the slide 5 in the z direction. A not depicted slipping clutch interrupts the flow of power between motor 6 and slide 5 if slide 5 is at one of the stops 7. The slipping clutch, which in particular can be an electromagnetic slipping clutch with an adjustable slipping moment, moreover, serves to limit the measurement and system force.

Furthermore, sensors are provided for the position of the peripheral edge and/or the occurring forces. The sensor for the position of the peripheral edge can, by way of illustration, be an optical sensor which determines the z coordinates "on-line" prior to the facetting step or during the facetting step. Furthermore, the sets of data $z(\phi)$ giving the course in the z direction of the frame, in which the ophthalmic lens 1 to be processed is to be inserted, as the function of $\phi$ can be entered into the control unit. These sets of data $z(\phi)$ can, by way of illustration, be measured by an off-line measurement device, such as a tracer, and entered via an interface. As an alternative, the sets of data $z(\phi)$ can be entered into the control unit as "points of measurement" via a feeding means, by way of illustration, an overlay keyboard.

In any event, the invented apparatus permits controlling the relative movement of the tool in the direction of the z axis in such a manner that the facet has a prescribed position on the peripheral edge of the opthalmic lens, perferably with the control unit computing the position of the facet on the peripheral edge of the ophthalmic lens from the sets of data $z(\phi)$. Moreover, the sets of data $r(\phi)$ stored in the control unit as well as, if need be, the sets of data $z(\phi)$ can also be utilized for the deburring step.

If no facet with a prescribed position on the peripheral edge of the opthalmic lens 1 is to be produced, the slide 5 executes an oscillating movement, with the control unit reversing the direction of the slide movement, if a slip sensor detects a slipping of the slipping clutch.

What is claimed is:

1. An apparatus faceting opthalmic lenses having at least one faceting tool which can be brought into contact with a peripheral edge of an opthalmic lens, which is held in a grip, and having for said faceting tool a control unit, in which the scheduled data for the radius r of said opthalmic lens to be processed in dependence on the angle ($\phi$) of a rotational angle of the grip of the opthalmic lens are stored and which regulates the processing according to said scheduled data, characterized by said control unit regulating the relative movement between said tool and said grip in a direction of the z axis which is substantially perpendicular to the plane of the opthalmic lens in such a manner that the facet has a prescribed position on the peripheral edge of the opthalmic lens, said control unit being provided with a sensor which detects the z coordinates of the peripheral edge of the opthalmic lens "on line" as the function of $\phi$ at least during and/or depending on the faceting step, with said control unit utilizing results of the "on-line" peripheral edge detection for regulating the relative movement.

2. An apparatus according to claim 1, characterized by said sensor being an optical sensor.

3. An apparatus according to claim 1, characterized by sets of data $z(\phi)$ giving the course in the z direction of the frame, into which the opthalmic lens to be processed is to be inserted, as a function of $\phi$ being entered into said control unit.

4. An apparatus according to claim 3, characterized by said sets of data $z(\phi)$ being measured by an off-line measurement device, such as a tracer, and entered via an interface.

5. An apparatus according to claim 3, characterized by said sets of data $z(\phi)$ being entered into said control unit as "points of measurement" via a feeding means, by way of illustration an overlay keyboard.

6. An apparatus according to any one of the claims 1, 3, to 4, characterized by said control unit computing the position of the facet on the peripheral edge of the opthalmic lens from said sets of data $z(\phi)$.

7. An apparatus according to claim 6, characterized by said control unit positioning the facet on the peripheral edge in such a manner that protrusions of the opthalmic lens to the front over the frame are the same on all points.

8. An apparatus according claim 1, characterized by a linear guide being provided which moves said facetting tool relative to the gripped opthalmic lens in the z direction.

9. An apparatus according to claim 8, characterized by a motor being provided through the rotary movement of which a slide bearing said facetting tool or said grip for the opthalmic lens, is moved in the z direction via a transmission unit.

10. An apparatus according to claim 9, characterized by an angle of rotation sensor determining the angle of rotation of a rotary drive for said slide, respectively the motor drive shaft.

11. An apparatus according to claim 9 or 10, characterized by said motor being a step-by-step motor.

12. An apparatus according to claim 10, characterized by two stops being provided which limit the movement of said slide.

13. An apparatus according to claim 12, characterized by a slipping clutch being provided which interrupts the flow of power between said motor and said slide when said slide is at one of the stops.

14. An apparatus according to claim 9, characterized by said slide executing an oscillating movement if no facet having a prescribed position on the peripheral edge is to be produced, with the control unit reversing the direction of the slide movement if a slipping sensor detects a slip of the slipping clutch.

15. An apparatus according to claim 1, characterized by also being able to utilize for a deburring step the sets of data r($\phi$) stored in said control unit as well as, if need be, said sets of data z($\phi$).

16. An apparatus according to claim 1 or claim 3, characterized by said control unit controlling the location of said facet on the peripheral edge of the opthalmic lens on the basis of output signals from said sensor.

17. An apparatus faceting ophthalmic lenses having at least one faceting tool which can be brought into contact with a peripheral edge of an ophthalmic lens, which is held in a grip, and having for said faceting tool a control unit, in which scheduled data for a radius r of said ophthalmic lens to be processed in dependence on the angle ($\phi$) of a rotational angle of the grip or the ophthalmic lens are stored and which regulates processing according to said scheduled data, characterized by said control unit regulating the relative movement between said faceting tool and said grip in a direction of a z axis which is perpendicular to a plane of the ophthalmic lens in such a manner that the facet has a prescribed position on the peripheral edge of the ophthalmic lens, said control unit being provided with an optical sensor which detects z coordinates of the peripheral edge of the ophthalmic lens "on line" as the function of $\phi$ at least during faceting of the ophthalmic and providing output signals indicative thereof, said control unit controlling the location of said facet on the peripheral edge of the ophthalmic lens during and/or depending on the faceting on the basis of the output signals from said optical sensor, with said control unit utilizing results of the "on-line" peripheral edge detection for regulating the relative movement.

18. An apparatus facetting opthalmic lenses having at least one facetting tool which can be brought into contact with a peripheral edge of an opthalmic lens, which is held in a grip, and having for said facetting tool a control unit, in which the scheduled data for the radius r of said opthalmic lens to be processed in dependence on an angle ($\phi$) are stored and which regulates the processing according to said scheduled data, characterized by said control unit regulating the relative movement between said tool and said grip in a direction of the z axis in such a manner that the facet has a prescribed position on the peripheral edge of the opthalmic lens, said control unit being provided with an optical sensor which determines the z coordinates of the peripheral edge of the opthalmic lens in real time as a function of $\phi$ during the facetting step.

19. An apparatus facetting ophthalmic lenses having at least one facetting tool which can be brought into contact with a peripheral edge of an ophthalmic lens, which is held in a grip, and having for said facetting tool a control unit, in which scheduled data for a radius r of said ophthalmic lens to be processed in dependence on an angle ($\phi$) of a rotational angle of the grip or the ophthalmic lens are stored and which regulates processing according to said scheduled data, characterized by said control unit regulating the relative movement between said facetting tool and said grip in a direction of a z axis which is perpendicular to a plane of the ophthalmic lens in such a manner that the facet has a prescribed position on the peripheral edge of the ophthalmic lens, said control unit being provided with an optical sensor which determines z coordinates of the peripheral edge of the ophthalmic lens as a function of $\phi$ concurrently with facetting of the ophthalmic lens and providing output signals indicative thereof, said control unit controlling the location of said facet on the peripheral edge of the ophthalmic lens during the facetting on a basis of the output signals from said optical sensor.

* * * * *